United States Patent [19]
Jordan

[11] 3,748,201
[45] July 24, 1973

[54] THICKENING COMPOSITIONS CONTAINING XANTHOMONAS GUM AND HYDROXYALKYL ETHER OF GUAR GUM

[75] Inventor: Wesley A. Jordan, Minneapolis, Minn.

[73] Assignee: General Mills Chemicals, Inc., Minneapolis, Minn.

[22] Filed: Oct. 8, 1971

[21] Appl. No.: 187,892

[52] U.S. Cl............. 149/109, 149/44, 149/60, 149/76, 260/209 R, 117/165
[51] Int. Cl............................................. C06b 15/00
[58] Field of Search ............... 149/44, 76, 60, 109; 260/209 R; 252/1; 117/165

[56] References Cited
UNITED STATES PATENTS

| | | | |
|---|---|---|---|
| 3,326,733 | 6/1967 | Colegrove | 149/44 X |
| 3,395,056 | 7/1968 | Bronstein | 149/44 |
| 3,465,675 | 9/1969 | Bronstein | 149/44 X |
| 3,658,607 | 4/1972 | Cook et al. | 149/44 X |

Primary Examiner—Stephen J. Lechert, Jr.
Attorney—Anthony A. Juettner, Elizabeth Tweedy et al.

[57] ABSTRACT

A blend of xanthomonas gum and hydroxyalkyl ether of guar gum which has unique thickening properties. The blend is particularly useful in printing paste and explosive slurries.

5 Claims, No Drawings

THICKENING COMPOSITIONS CONTAINING XANTHOMONAS GUM AND HYDROXYALKYL ETHER OF GUAR GUM

This invention relates to thickening compositions. More particularly, this invention relates to thickening compositions comprising xanthomonas gum and hydroxyalkyl ether of guar gum and printing paste and explosive slurries containing said thickening compositions.

Natural and synthetic gums have been used as thickeners for foods, coatings, paints, dyes, explosive slurries, oilwell fluids and many other applications. Thickeners impart viscosity to sols in which they are incorporated. When there is no change in viscosity when shear force through agitation is applied to the sol, the behavior of the thickener is said to be Newtonian. A thickener is said to be plastic when the viscosity of the sol in a quiescent state is greater than when a shear force is applied through agitation, the viscosity decreases as the shear force applied increases, and the viscosity recovers immediately when the magnitude of shear force is decreased. Generally, when the sol is at rest, the molecules arrange themselves into a more or less stable form. In order to break this stable molecular arrangement and cause the sol to yield, the application of a shear force is necessary. The shear force required to cause the sol to yield and flow is termed the gel strength. Once the gel strength of a plastic sol is overcome, the viscosity of the sol decreases as greater shear force is applied. Another property of plastic sols is their viscosity differential. By viscosity differential is meant the drop in viscosity between viscosities at low shear force and at high shear force. This is a measure of the rate and extent of thinning due to agitation. Still another property of plastic sols is the relationship betwen viscosity and thickener concentration. Sols, which exhibit a large viscosity decrease as the concentration of thickener decreases, can be easily thinned by diluting with a solvent. Finally, the flow rate of the sol at any viscosity is important in many applications.

It is readily apparent that high gel strengths are desirable when other materials are to be suspended in the sol. This is true with products such as in paints and explosive slurries. It is also apparent that plastic properties, namely a decrease in viscosity with agitation, is important when the suspended material is to be moved or deposited from the sol. For example, in the case of paint it is desirable to suspend as much pigment as possible in the sol and not have it settle during storage. When actually used, it is desirable that the paint thin out with stirring, brushing or rolling so that the paint will spread onto a surface. It is further apparent that high viscosity differentials are desirable to combine the greatest gel strength and viscosity, when the sol is at rest, with the greatest spreadability, when the sol is agitated. Finally, it is apparent that when the sol is to be removed after the suspended material is deposited, a rapid decrease in viscosity as the sol is diluted is desirable.

Aqueous sols of xanthomonas gum are plastic in nature and exhibit higher gel strengths than sols of other gums. Aqueous sols of hydroxyalkyl ether of guar are almost Newtonian and exhibit little or no gel strength. Aqueous sols of the thickening compositions of the present invention are plastic in character. At certain concentrations of the thickening compositions in aqueous sols, the sols have higher gel strengths than can be obtained from xanthomonas gum alone. At certain concentrations, the aqueous sols containing the thickening compositions exhibit greater viscosity differentials than do sols containing xanthomonas gum alone. In addition, the aqueous sols exhibit a greater drop in viscosity as the thickening composition concentration is reduced than do aqueous sols of xanthomonas gum alone.

Xanthomonas gum is one component in the thickening compositions of the present invention. Xanthomonas gum can be made by the fermentation of carbohydrate with bacteria of the genus Xanthomonas. Representative of these bacteria are *Xanthomonas campestris*, *Xanthomonas phaseoli*, *Xanthomonas mulvacearn*, *Xanthomonas carotae*, *Xanthomonas translucens*, *Xanthomonas hederae* and *Xanthomonas papavericoli*. The gum produced by the bacteria *Xanthomonas campestris* is preferred for the purpose of this invention. The fermentation usually involves inoculating a fermentable broth containing a carbohydrate, various minerals and a nitrogen yielding compound. A number of modifications in the fermentation procedure and subsequent processing are commercially used. Due to the variety of fermentation techniques and differences in processing operation subsequent to fermentation, different production lots of xanthomonas gum will have somewhat different solubility and viscosity properties. Xanthomonas gum useful in the practice of the present invention are relatively hydratable xanthomonas gums. In general, xanthomonas gums having hydratability at 1 percent concentration by weight of about 1,800 to 3,500 centipoise in water and in an aqueous solution containing 3 percent by weight potassium hydroxide are used. Preferably, xanthomonas gum having a hydratability in the above media of about 2,000 to 3,000 centipoise are used. The hydratability is measured at a temperature of about 25° C.

The xanthomonas gum used in the blends of xanthomonas gum and hydroxypropyl guar gum discussed in detail below was made according to the following procedure. In the first step the bacteria was grown on an agar slant. In the second step bacteria from the slant was used to inoculate two liter aliquots of a fermentable broth containing per liter: sucrose, 20 grams; $Na_2HPO_4 \cdot 12H_2O$, 8 grams; $NaH_2PO_4$, 1 gram; $MgSO_4 \cdot 7H_2O$, 0.25 gram; and 90 grams of cooked soy meal dispersion. The cooked soy meal suspension was made by agitating at 180 rpm, 90 grams of soy meal in 600 ml. of water at a temperature of 90°C. for a period of 30 minutes and then centrifuging and discarding the residue. The above broth was allowed to ferment for a period of 31 hours at a temperature of about 28° to 30°C. In the third step the broth was used to inoculate a 15 liter batch containing the same broth composition. The broth of the third step was allowed to ferment for a period of 29 hours at a temperature of about 28° to 30°C. The broth from the third step was used to inoculate a 15,000 liter batch of broth having the composition per liter of broth, sucrose 20 grams; cooked soy meal dispersion, 6 grams; rapeseed oil, 0.65 gram; sulfuric acid, 0.53 gram; $MgSO_4 \cdot 7H_2O$, 0.25 gram; $Na_2HPO_4 \cdot 12H_2O$, 15 grams and tap water. The final batch was allowed to ferment for a period of about 72 hours at a temperature of about 28° to 30°C. At the end of the final fermentation period the broth was steam sterilized to destroy all the viable microorganisms. The pH of the broth was then adjusted to 7.9 by the addition of potassium hydroxide and the gum recovered from the broth by the addition of isopropyl alcohol.

The hydroxyalkyl ether of guar gum used in the thickening composition of the present invention can be made by reacting guar gum with alkylene oxide in the presence of an alkaline catalyst. The alkylene oxide forms an ether linkage with a hydroxyl group of the guar gum. In guar gum each saccharide ring has an average of three hydroxyl groups with which the alkylene oxide can react. The degree of substitution of the hydroxyalkyl ether group is defined as oxirane equivalents of alkylene oxide per anhydrohexose unit of guar gum. The degree of substitution generally useful in the practice of this invention is about 0.2 to 1.2 and preferably about 0.8 to 0.9. Hydroxyalkyl ethers of guar gum that can be used in the practice of this invention are those derived from reacting an alkylene oxide containing two to four carbon atoms, namely ethylene oxide, propylene oxide and butylene oxide. 1,2-Butylene oxide is a common commercial chemical. 2,3-Butylene oxide is generally present in crude mixtures with 1,2-Butylene oxide.

In order for the reaction between the guar gum and the alkylene oxide to proceed, the presence of an alkaline catalyst is necessary. Such catalysts are in general the alkali metal or alkaline earth metal hydroxides such as sodium, potassium or calcium hydroxide. Ammonia may also be used, as well as more complex basic catalysts such as benzyl trimethyl ammonium hydroxide. No special advantage, however, is obtained by the use of more exotic basic or alkaline catalysts over the use of sodium hydroxide which is commonly available.

Very small amounts of catalyst may be employed, as low as 0.05 percent based on the weight of the guar gum. It is generally not necessary to exceed 10 percent by weight of the guar gum, although larger amounts might be used. In general, about 2 percent to 3 percent catalyst by weight of the guar gum is employed.

The reaction can be conducted at room temperature or elevated temperatures. The temperature range in which the reaction is generally conducted is about 17°C. to about 100°C. While higher temperatures can be used, such as up to 125°C., there is generally no advantage achieved.

The reaction can be conducted at atmospheric temperature, under reflux, or at elevated pressures in a closed reactor. The exact pressure is not critical and while higher pressure may be employed, operation is normally conducted at whatever pressure develops during the reaction. Generally such autogenous pressures will be on the order of from about 30 to 125 p.s.i.g.

The reaction may be conducted in the substantial absence of water or solvent (no water added) although the efficiency of the reaction is very low without the addition of water. Accordingly, the reaction is generally conducted in the presence of water to provide higher reaction efficiency. In the absence of other solvents, catalytic amounts of water on the order of about 3 to 8 percent by weight based on the guar gum are employed. These small amounts are generally used where higher temperatures and elevated pressures are employed, whereas larger amounts of water are used when lower tamperatures and atmospheric pressure are employed. Further, other organic solvents either water-miscible or water-immiscible organic solvents can be employed. Illustrative of such organic solvents are isopropanol (water-miscible) and heptane (water-immiscible). Other unreactive organic solvents may be employed although the two mentioned are preferred. Such other organic solvents are the common aliphatic hydrocarbons having from five to ten carbon atoms which are commercially available such as heptane and hexane. Alcohols higher than methanol, those having from two to six carbon atoms, may be employed also such as t-butanol, the only requirement being that the solvent be substantially unreactive. Where higher water levels are employed, the water should be sufficient to swell the guar gums slightly, thereby making the gum more reactive. When employed with a solvent, such as isopropanol or heptane, from about 10 to 80 percent water based on the weight of guar gum, is employed. The preferred amount of water is about 30 to 70 percent with the water-miscible solvents and about 20 to 30 percent with the water-immiscible solvents.

Where organic solvents are employed, they are generally present in an amount up to eight times the amount of gum by weight, although larger amounts may be employed if desired. Generally, with water-miscible solvents, an amount equal to one to three times the weight of gum is employed. With water-immiscible solvents, an amount of from three to five times the weight of gum is generally employed. With the organic solvents, the ratio by weight of water to organic solvent is preferably within the range of about 0.05 to 0.5. A range of 0.2 to 0.45 is preferred with the water-miscible organic solvents and from about 0.1 to 0.2 is preferred with the water-immiscible organic solvents. In general, any unreactive organic solvent may be employed. With the lower ratios of water to organic solvent, the reaction is slower. With the higher ratios, the recovery of product by filtration is slowed.

The thickening compositions of this invention can be made by dry blending xanthomonas gum and hydroxyalkyl ether of guar gum. The blends contain about 5 to 95 percent xanthomonas gum by weight of the blend and about 5 to 95 percent hydroxyalkyl ether of guar gum. A sol of a particular blend can be made by mixing the blend into water or other aqueous fluid with agitation and then allowing the sol to stand until hydration of the components is complete. Hydration at room temperature is usually complete after a few hours.

The rheological properties of aqueous sols made from blends of xanthomonas gum and hydroxypropyl guar gum and from xanthomonas gum and hydroxypropyl guar gum alone are set out in detail in Tables 1 and 2. The sols used in obtaining the measurements shown in Tables 1 and 2 were made according to the following procedure. Water in the amount of 495 grams was agitated in a Waring Blendor at a speed required to form a vortex one half the distance from the water surface to the blades. To the water being agitated was added 5.0 grams of a given blend or component gum. This amount of blend produced sol containng 1 percent blend or component gum by weight. Stirring was continued for 30 seconds and the mixture was transferred to a 600 ml. beaker. After 4 hours, all the sols had reached their maximum viscosity. The sols were allowed to stand an additional 16 hours to stabilize.

Viscosity measurements were made according to the following procedure. After a total of 20 hours, the viscosities of the blends containing 1 percent blend of component gum by weight were then measured using a Brookfield LVT Viscometer equipped with a No. 3 spindle. The temperature of all the samples was 25°C.

After determining the viscosity of the 1 percent sols, a portion of each sample was diluted to make samples containing 0.5 percent, 0.1 percent and 0.05 percent blend or component gum by weight respectively. The viscosities of the sols containing 0.5 percent and 0.1 percent blend or component gum by weight were determined using a Brookfield LVT Viscometer with a No. 3 spindle. The viscosities of the sols containing 0.05 percent blend or gum were measured using a Brookfield LVT Viscometer equipped with a UL Adaptor rotating at 6 rpm.

The gel strengths of the 1 percent sols were measured using a Model 35 Fann VG Viscometer according to the following procedure. The particular sol was agitated for 1 minute at 600 rpm. Agitation was stopped and the sol was kept in a quiescent state for 3 minutes. Agitation was again started at 3 rpm. and the maximum deflection on the dial was recorded. The dial reading was recorded in terms of pounds per square foot.

The flow rate of the sols was measured according to the following procedure. A Marsh Funnel having the dimensions 6 inches in diamter at the top, 12 inches long, tapering to join a tube 2 inches long with a three-sixteenths inch inside diameter was used. The capacity of the funnel was 1,500 ml. The discharge end of the funnel was closed with a rubber cap. The sol was transferred to the funnel. The initial amount of sol placed in the funnel was 450 grams. The funnel was placed over a beaker resting on the platform of a scale. The cap on the discharge end of the funnel was removed. A stop watch was started. The time required to discharge 300 grams and 350 grams of the sol was measured. The number of seconds required to discharge the 50 grams of the sol between the discharge of 300 grams and the discharge of 350 grams was calculated and recorded as grams per second.

From the above data it can be readily seen the gel strengths exhibited by the blends of xanthomonas gum and hydroxypropyl guar gum were higher than those exhibited by the xanthomonas gum alone. Xanthomonas gum is itself unique among gum because of its relatively high gel stregnth. Yet, by blending it with hydroxypropyl guar gum, which has substantially no gel strength, even higher gel strenghts were obtained. Higher gel strengths are beneficial in any application in which solid materials are to be suspended and stored in a thickened sol. Among such applications are thickening of paints, explosive materials and drilling muds. Looking particularly at the blend of 90 percent xanthomonas gum and 10 percent hydroxypropyl guar gum, increased gel strength was achieved without any loss in flowability. Thickening compositions that contain about 70 percent to 90 percent xanthomonas gum by weight and about 10 to 30 percent hydroxypropyl guar gum produce sols having a combination of gel strength and flowability which is peculiarly adapted to applications in which suspended material is to be stored in a thickened sol and eventually spread or pumped.

Using the viscosity measurement method described above the viscosities of eight blends containing different proportions of xanthomonas gum and hydroxypropyl guar gum and two controls of xanthomonas gum and hydroxypropyl guar gum alone were measured. The samples contained the blends and individual gums at concentration levels of 1 percent, 0.5 percent, 0.1 percent and 0.05 percent by weight. The shear force applied to the sols were generated by viscometer speeds of 12, 30 and 60 rpm. The temperature was 25°C. The results are shown in Table 2.

TABLE 2

[Viscosity profile of sols containing thickeners]

| Percent by weight component in blend: | | | | | | | | | | |
|---|---|---|---|---|---|---|---|---|---|---|
| Xanthomonas gum | 100 | 90 | 80 | 70 | 60 | 50 | 40 | 30 | 20 | 0 |
| Hydroxypropyl guar gum | 0 | 10 | 20 | 30 | 40 | 50 | 60 | 70 | 80 | 100 |
| Viscosity of 1% sols, centipoise rotation speed: | | | | | | | | | | |
| 12 r.p.m | 3,900 | 4,250 | 4,400 | 4,450 | 4,850 | 5,300 | 5,570 | 5,550 | 5,400 | 4,450 |
| 30 r.p.m | 1,760 | 1,860 | 1,960 | 2,000 | 2,240 | 2,480 | 2,800 | 2,800 | 2,800 | 2,600 |
| 60 r.p.m | 980 | 1,030 | 1,090 | 1,120 | 1,250 | 1,400 | 1,640 | 1,680 | 1,680 | 1,680 |
| Viscosity of 0.5% sols, centipoise rotation speed: | | | | | | | | | | |
| 12 r.p.m | 1,800 | 1,700 | 1,550 | 1,500 | 1,350 | 1,150 | 1,050 | 850 | 650 | 350 |
| 30 r.p.m | 800 | 760 | 720 | 720 | 700 | 660 | 640 | 560 | 460 | 300 |
| 60 r.p.m | 420 | 420 | 420 | 410 | 410 | 390 | 380 | 350 | 310 | 260 |
| Viscosity of 0.1% sols, centipoise rotation speed: | | | | | | | | | | |
| 12 r.p.m | 102 | 87 | 72 | 60 | 50 | 37 | 30 | 22 | 15 | 5 |
| 30 r.p.m | 65 | 56 | 49 | 44 | 34 | 27 | 22 | 15 | 11 | 5 |
| 60 r.p.m | 42 | 38 | 33 | 29 | 24 | 20 | 17 | 14 | 11 | 6 |
| Viscosity of 0.05% sols, centipoise rotation speed, UL adaptor: 6 r.p.m | 21 | 21 | 17 | 16 | 14 | 12 | 9 | 8 | 5 | 3 |

Using the methods for measuring gel strength and flow rate described above, the gel strength and flow rate of eight blends containing different proportions of xanthomonas gum and hydroxypropyl guar gum and two controls of xanthomonas gum and hydroxypropyl guar gum respectively at concentrations of 1 percent blend or component gum by weight were measured. The results are shown in Table 1.

TABLE 1

Gel Strength and Flow Rates of Thickeners at 1% by weight Concentration

| Thickener Composition Percentage by Weight | | Gel Strength lbs/100 ft.² | Flow Rate g./sec. |
|---|---|---|---|
| Xanthomonas Gum | Hydroxypropyl Guar | | |
| 100 | 0 | 25 | 2.94 |
| 90 | 10 | 28 | 2.94 |
| 80 | 20 | 32 | 2.00 |
| 70 | 30 | 31 | 1.84 |
| 60 | 40 | 33 | 1.00 |
| 50 | 50 | 34 | 0.71 |
| 40 | 60 | 35 | 0.62 |
| 30 | 70 | 33 | 0.55 |
| 20 | 80 | 33 | —* |
| 0 | 100 | Nil | 0.62 |

*Measurement not taken.

As shown in Table 2, blends of xanthomonas gum and hydroxypropyl guar gum at a concentration level of 1 percent develop viscosities in a sol greater than the viscosities developed by xanthomonas gum alone. Blends having compositions between about 60 percent xanthomonas gum combined with 40 percent hydroxypropyl guar gum and 10 percent xanthomonas gum combined with 90 percent hydroxypropyl guar gum have higher viscosities than hydroxypropyl guar gum alone when subjected to relatively low shear rates. At higher shear rates the viscosities of the sols containing blends decrease to about or below those of hydroxypropyl guar gum. Over the entire blend composition range, the blends of xanthomonas gum and hydroxypropyl guar gum used at concentration levels of 1 percent by weight in the sol show more pronounced plastic characteristics and higher viscosity differentials than either xanthomonas gum or hydroxypropyl guar gum alone.

Also apparent from the data shown in Table 2, the viscosities developed by the xanthomonas gum and hydroxypropyl guar gum blend used at concentration levels of 0.5 percent, 0.1 percent and 0.05 percent by weight of the sol were gradients between the high viscosities developed by xanthomonas gum used alone and the lower viscosities developed by hydroxypropyl guar gum used alone. The higher viscosities obtained from blend concentrations of 1 percent by weight of the sol combined with the lower viscosities obtained at blend concentrations of 0.5 percent and below by weight of the sol, make the xanthomonas gum and hydroxypropyl guar gum blends very useful in operations involving holding dissolved material in suspension, depositing the dissolved material and then washing away the sol. This type of operation is found in dyeing yarn for carpets discussed in more detail below.

One of the industrial applications to which the thickener blends of this invention are particularly adapted is the dyeing of yarn for carpeting. There are basically two techniques for dyeing yarn for carpets. One technique is to consecutively apply colors to short, preset lengths of fiber yarn. The second technique is to knit a tubing of yarn, print colors onto the yarn, then unknit the tubing and rewind the yarn. The contact of the yarn with the dye is so programmed as to produce a predetermined sequence of color application. Dyeing by either method of handling the yarn involves printing a color onto the yarn using a printing paste, fixing the color by steaming, washing away the paste leaving the dye affixed to the yarn, drying, winding and packaging the yarn. The printing is accomplished by passing a roller over stands of yarn or the knitted tube. The roller itself may either carry the printing paste or push the yarn against a surface carying the printing paste. In the case of individual strands of yarn being dyed, the strands of yarn may be passed over a grooved roller carrying printing paste in the grooves. Another roller operating in conjunction with the grooved roller periodically pushes the strands of yarn into the grooves thus contacting it with the printing paste. In the case of a knitted tube of yarn being dyed, the series of roller caryring printing paste are passed over the tubing depositing the printing paste onto the yarn. Once the printing paste is deposited on the yarn, the color is set by steaming. Steaming is usually conducted at temperatures between about 210° and 214° F. After the color has been set, the paste carrying the color is washed away.

Natural and synthetic gums have been widely used as thickeners for printing paste. The thickener holds the mark or color in the printing process. Once the paste is applied to the yarn, the thickner must allow the dye to penetrate the yarn. Once the dye has penetrated the yarn, the thickneer must hold the printing paste to prevent migration of the dye during steaming. Finally, it is necessary that the gum can be washed out of the fabric leaving the dye affixed to the yarn. In brief, the thickener ideally has the following characteristics: (a) a low viscosity during the rolling or printing operation to permit penetration of the color into the yarn, (b) high viscosity during steaming to prevent migration of the color, and (c) low viscosity upon dilution so that it can be easily washed away. A comparison of these requirements with the rheological character of blends of xanthomonas gum and hydroxypropyl guar gum containing from about 10 to 60 percent xanthomonas gum by weight and about 90 to 40 percent hydroxypropyl guar gum by weight show the following:

1. at concentrations of about 1 percent by weight the above blends display pronounced plastic properties producing low viscosities under high shear forces thus providing fluidity during the rolling color penetrating period, 2. at concentrations of about 1 percent by weight the above blends display higher viscosities under low shear force than does xanthomonas gum alone thus more firmly holding the dye in place during dyeing and steaming, and 3. at concentrations below about 0.75 percent by weight the blends have substantially lower viscosities than xanthomonas gum thus allowing easier removal by washing out by dilution than xanthomonas gum.

Blends of xanthomonas gums and hydroxypropyl guar gums provide another advantage in dyeing yarn for carpet in that the flow rate of the printing paste can be controlled by the composition of the blend. The penetration of a sol into yarn can be changed at will by adjusting the ratio of xanthomonas gum to hydroxypropyl guar gum in the blend. The adjustability of the flow rate of printing paste is also important in the flat printing of carpets. In this type of dyeing the yarn is already attached to a backing. The printing paste is rolled over the carpeting and ideally penetrates the length of the yarn to the backing and no further. If the printing paste does not penetrate the length of yarn to the backing, the yarn next to the backing is not dyed. If the prining paste penetrates beyond the length of the yarn, it forms puddles on the backing. Thus, the capability to adjust the flow rate of the printing paste in printing flat carpeting is very desirable. When carpets are printed after the yarn has been affixed to the backing, the thickener used in the printing paste is not washed out as in the yarn dyeing operation. Therefore, thickeners with high gel strengths are essential to avoid powdering off of the dye during dry handling or actual use. As the thickening compositions of the present invention exhibit unusually high gel strengths, they are peculiarly adapted to carpet printing.

Blends of xanthomonas gum and hydroxypropyl guar gum are compatible with anionic and nonionic dyes. Typical printing paste formulations include the dye, preservatives, anti-foaming agents, thickener and water. Typically, the blends of the present invention are used in amounts of about 0.75 to 1.25 percent by weight of the printing paste formulation.

Another industrial application in which the blends of this invention are particularly useful is in the making of explosive slurries. Explosive slurries usually contain about 15 to 20 percent water, about 50 to 90 percent explosive substance and a thickener. About 10 to 20 percent aluminum by weight of the slurry is usually added as a sensitizer. The blends of the present invention provide higher gel strengths in sols than can be obtained from natural or synthetic gums heretofore used to thicken explosive slurries. When the sols are cross linked to form gels, the gels are waterproof, nonpourable, pliable and non-brittle. Antimony oxide and ammonia water, chromic nitrate, zirconyl sulfate and ammonia water, potassium antimony tartrate and potassium dichromate are among the cross-linking agents that can be used to convert the sols to gels. Generally, the blends are used in amounts of about 0.7 to 1.5 percent by weight of the slurry.

Below is shown one typical explosive slurry formulation using a xanthomonas gum - hydroxypropyl guar gum blend and the same slurry formulation using xanthomonas gum and hydroxy-propyl guar gum individually. The formulation is as follows:

Explosive Slurry Formulation

| Components | Samples | | |
|---|---|---|---|
| | I parts | II parts | III parts |
| Ammonium Nitrate | 45 | 45 | 45 |
| Sodium Nitrate | 15 | 15 | 15 |
| Water | 19 | 19 | 19 |
| Xanthomonas Gum | 1 | — | 0.3 |
| Hydroxypropyl Guar Gum | — | 1 | 0.7 |
| Ammonium Perchlorate | 5 | 5 | 5 |
| Aluminum Flakes | 15 | 15 | 15 |
| Potassium Antimony Tartrate (dry) | 0.02 | 0.02 | 0.02 |
| Potassium Dichromate (0.1 ml. of 10% solution) | 0.01 | 0.01 | 0.01 |

The above explosive slurry samples were mixed according to the following procedure. The sodium nitrate and water were weighed into beakers. The mixtures were stirred until the sodium nitrate was substantially dissolved. To the nitrate solutions were added the ammonium nitrate and the thickeners. After stirring the mixtures about five minutes, the ammonium perchlorate was added followed by the aluminum and potassium antimony tartrate. Thirty minutes later 0.1 ml. of a 10 percent by weight potassium dichromate solution was stirred into each mixture. After a period of 1 hour during which cross linking occurred, a portion of each slurry was immersed in water to determine its degree of waterproofness.

Sample I was very firm, rigid and nonpourable immediately after preparation. The portion immersed in water showed no disintegration after 20 hours of immersion. The portion not immersed became dry, brittle and extremely cohesive.

Sample II was soft and enlarged after 20 hours of immersion in water. These changes indicated it has absorbed water.

Sample III after 20 hours immersion in water showed no indication of disintegration. The portion which had not been immersed was cohesive but sufficiently soft to be molded.

The thickeners of this invention exhibit many unique properties. In addition, the capacity to vary the composition of the blends to accentuate desired properties provides a wide flexibility of applications.

The embodiments of the invention in which an exclusive property or privilege is claimed are defined as follows:

1. A thickener blend comprising:
   about 5 to 95 percent xanthomonas gum by weight of the thickener blend, said xanthomonas gum having the hydratability at 1 percent concentration by weight of about 1,800 to 3,500 centipoise in water and in an aqueous solution containing 3 percent by weight potassium hydroxide, and
   about 5 to 95 hydroxyalkyl ether of guar gum by weight of the thickener blend, said hydroxyalkyl ether of guar gum having a degree of substitution of about 0.2 to 1.2 and wherein the alkyl group contains from two to four carbon atoms.

2. The thickener blend of claim 1 wherein the thickener blend comprises about 90 to 40 percent hydroxyalkyl ether of guar gum and about 10 to 60 percent xanthomonas gum.

3. The thickener blend of claim 1 wherein the thickener blend comprises about 10 to 30 percent hydroxyalkyl ether of guar gum and about 90 to 70 percent xanthomonas gum.

4. The thickener blend of claim 1 wherein the hydroxyalkyl ether of guar gum is hydroxypropyl guar.

5. The thickener blend of claim 1 wherein said xanthomonas gum has the hydratability in water and aqueous solutions of 3 percent potassium hydroxide by weight of about 2,000 to 3,000 centipoise.

* * * * *

PO-1050
(5/69)

UNITED STATES PATENT OFFICE
CERTIFICATE OF CORRECTION

Patent No. 3748201  Dated July 24, 1973

Inventor(s) Wesley A. Jordan

It is certified that error appears in the above-identified patent and that said Letters Patent are hereby corrected as shown below:

Col 1, line 36, "betwen" should read --between--. Col 3, line 63, "tamperatures" should read --temperatures--. Col 4, line 56, "containng" should read --containing--. Col 5, line 4, "weighct" should read --weight--. Table 2, line 4, "speee" should read --speed--; line 5, "5,570" should read --5,750--. Col 6, line 9, "stregnth" should read --strength--. Col 7, line 34, "carying" should read --carrying--; line 41, "roller" should read --rollers--; line 54, "thickneer" should read --thickener--. Col 8, line 28, "prining" should read --printing--; line 30, "adjuste" should read --adjust--. Col 9, line 37, "has" should read --had--. Col 10, line 19, "5 to 95" should read --5% to 95%--.

Signed and sealed this 12th day of February 1974.

(SEAL)
Attest:

EDWARD M. FLETCHER, JR.
Attesting Officer

C. MARSHALL DANN
Commissioner of Patents